Aug. 15, 1939. W. M. CARROLL 2,169,635
LIQUID DISPENSING APPARATUS
Filed Feb. 2, 1935 10 Sheets-Sheet 1
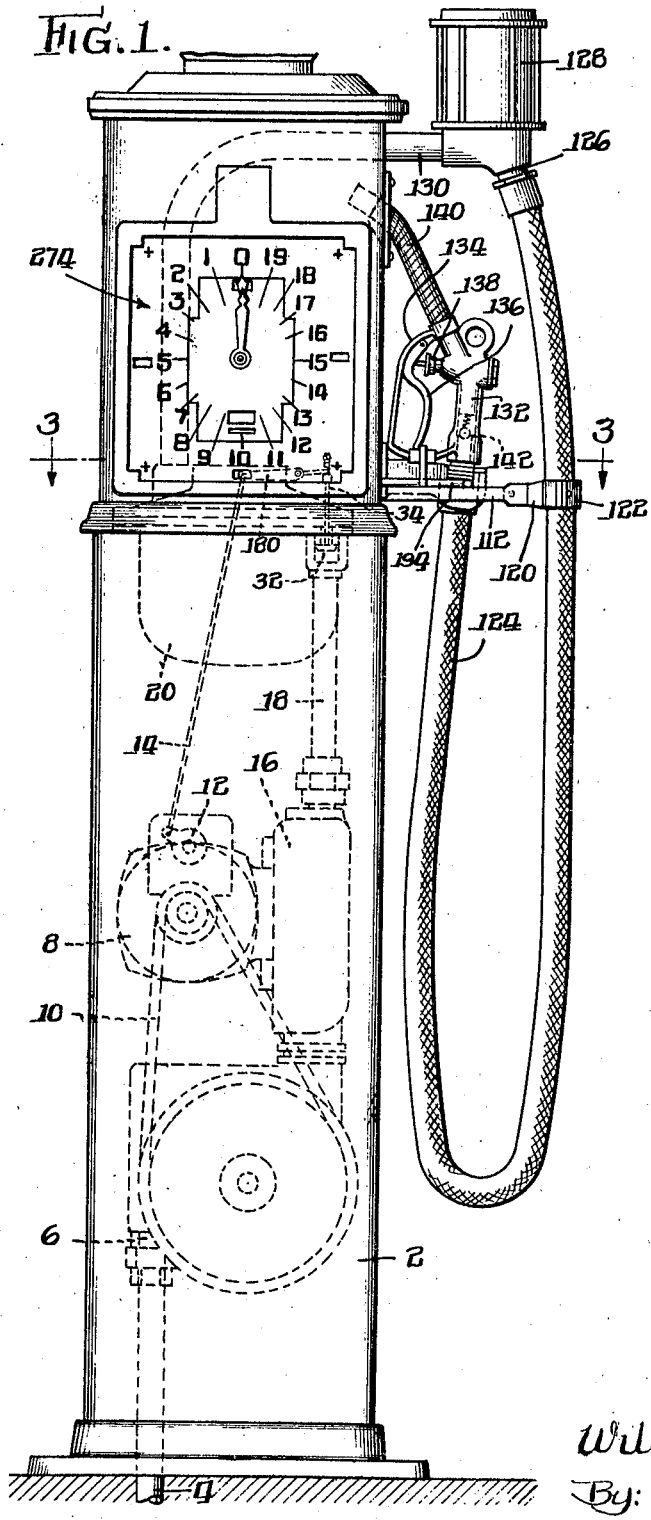
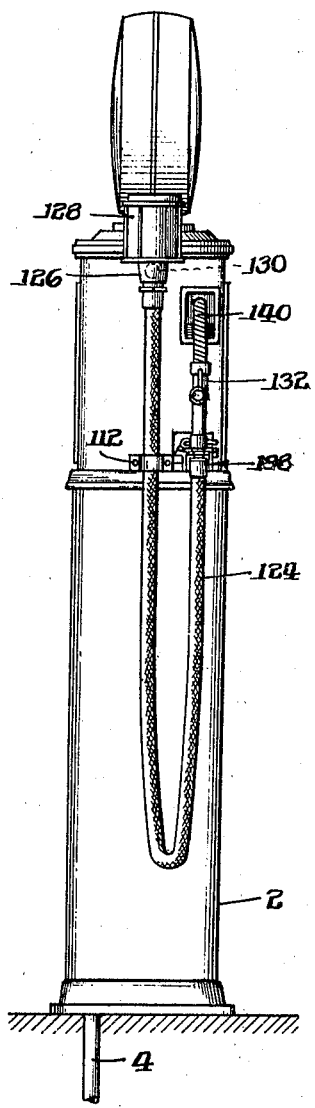
Inventor
William M. Carroll
By: Cox + Moore attys

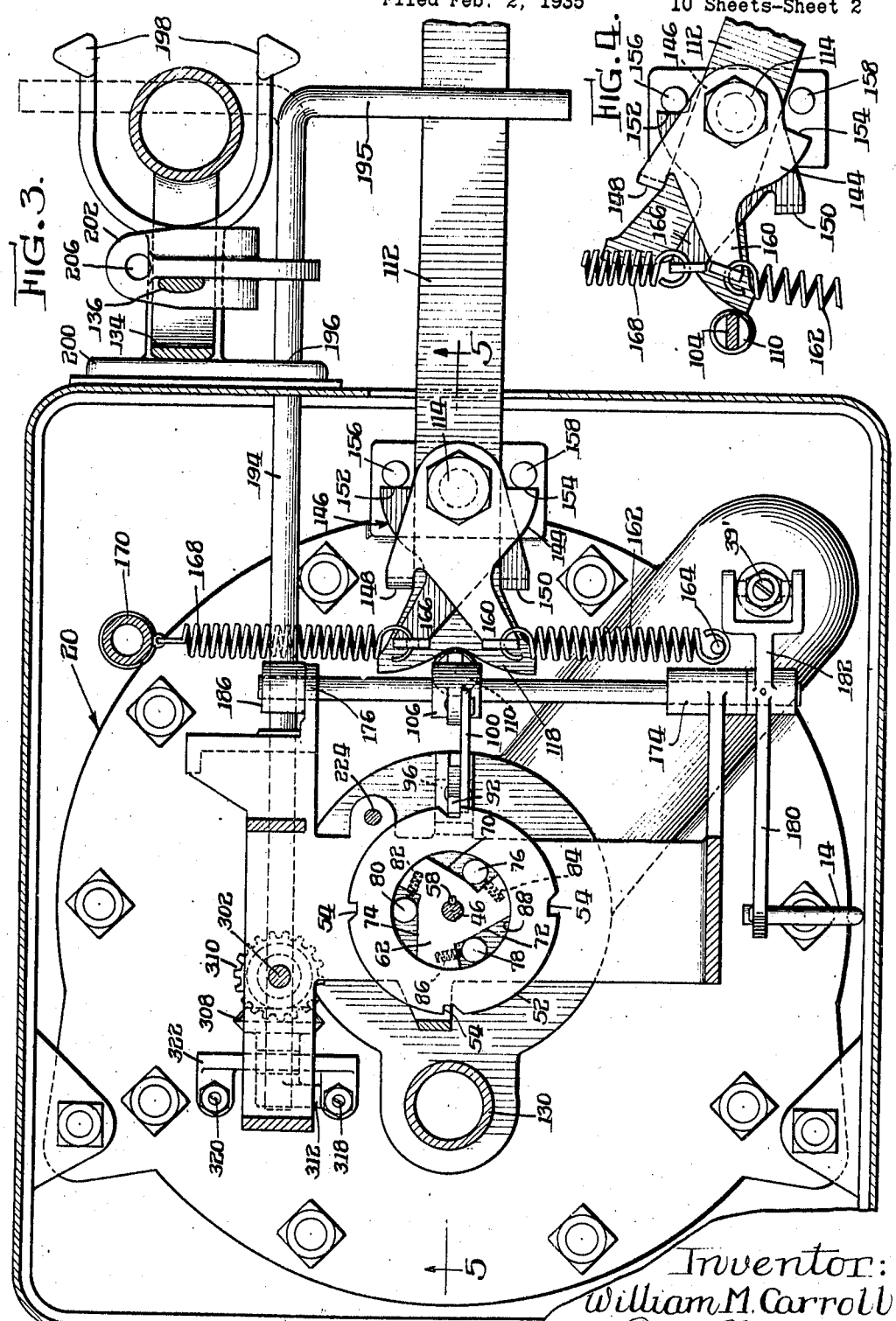

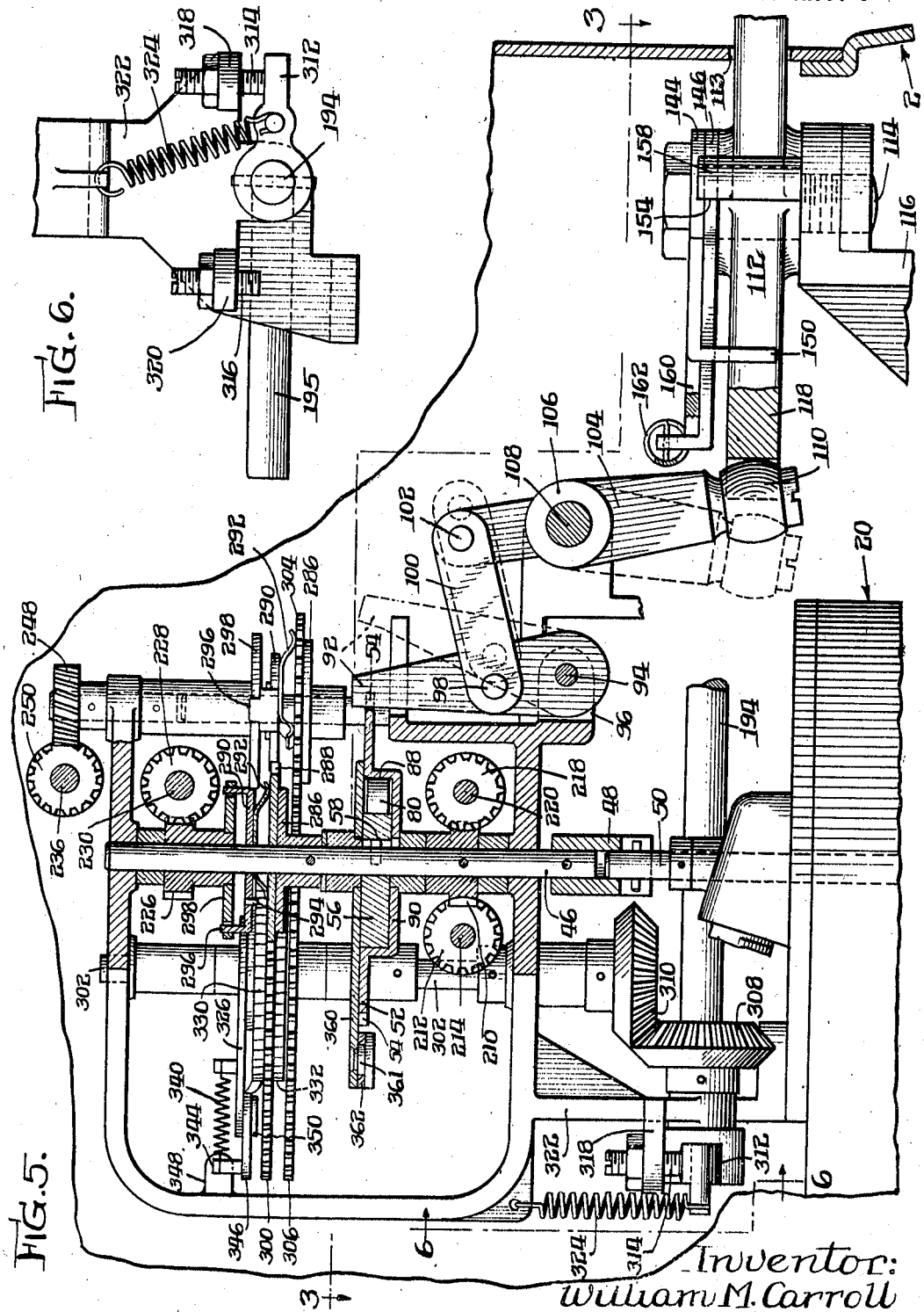

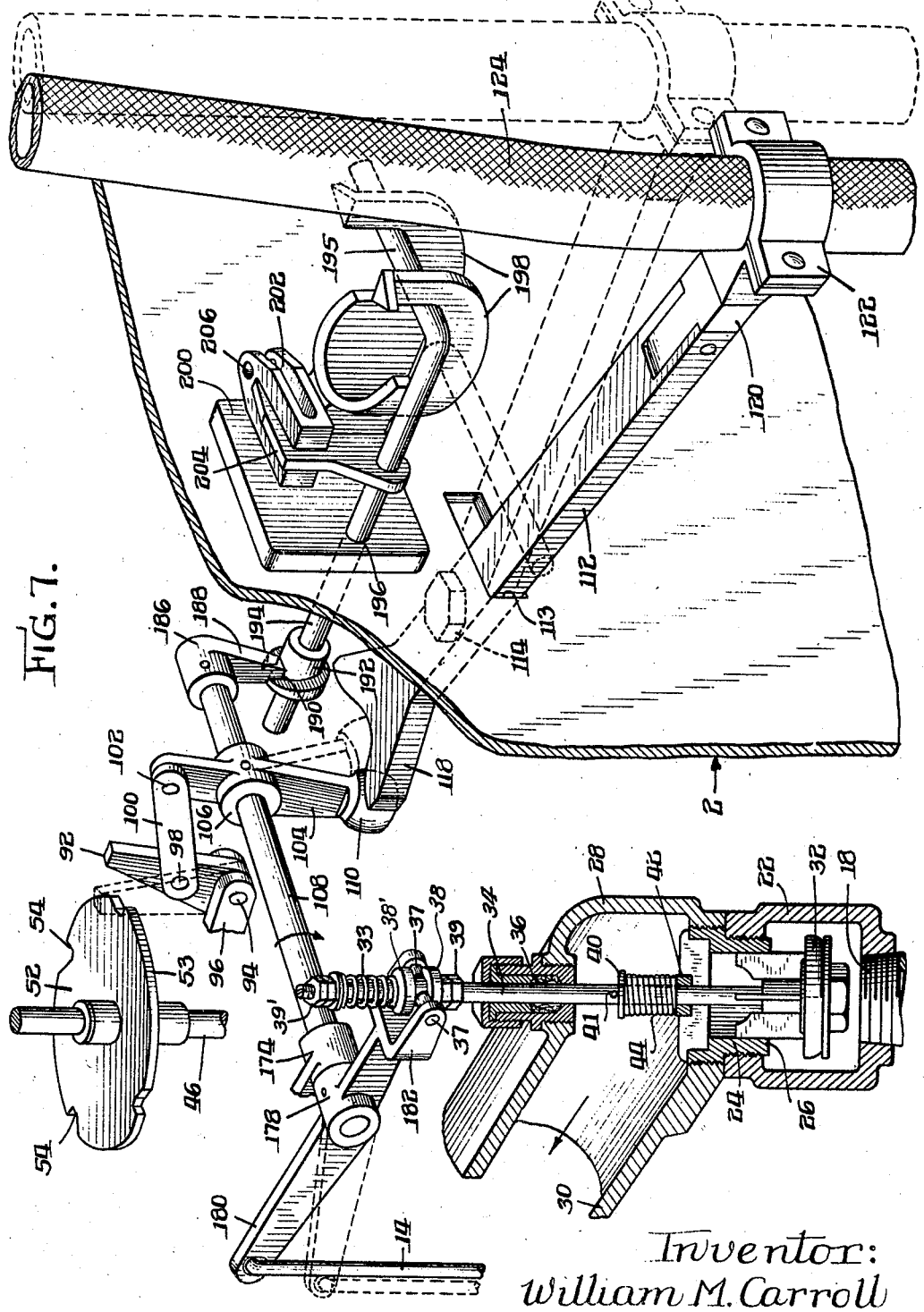

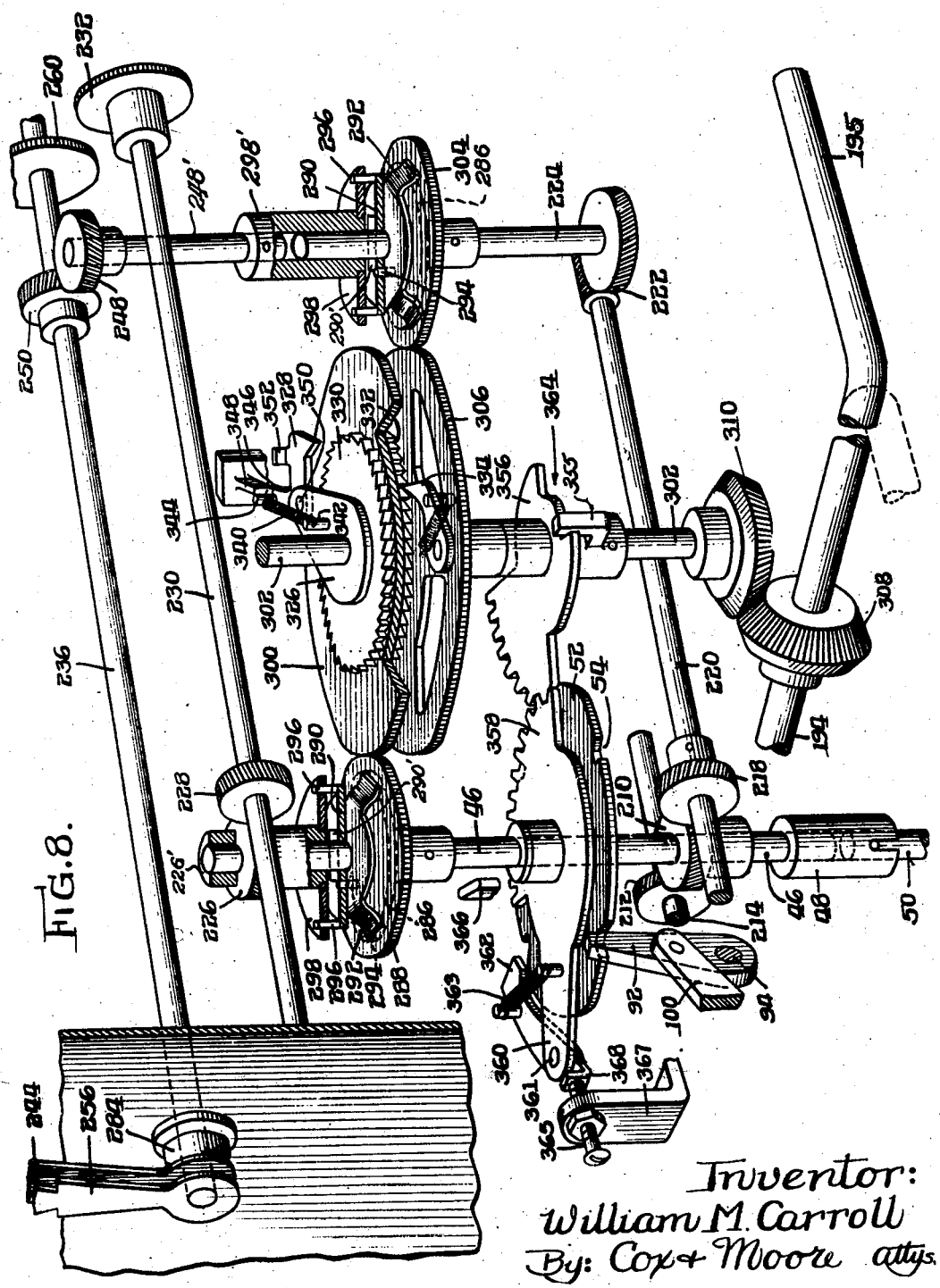

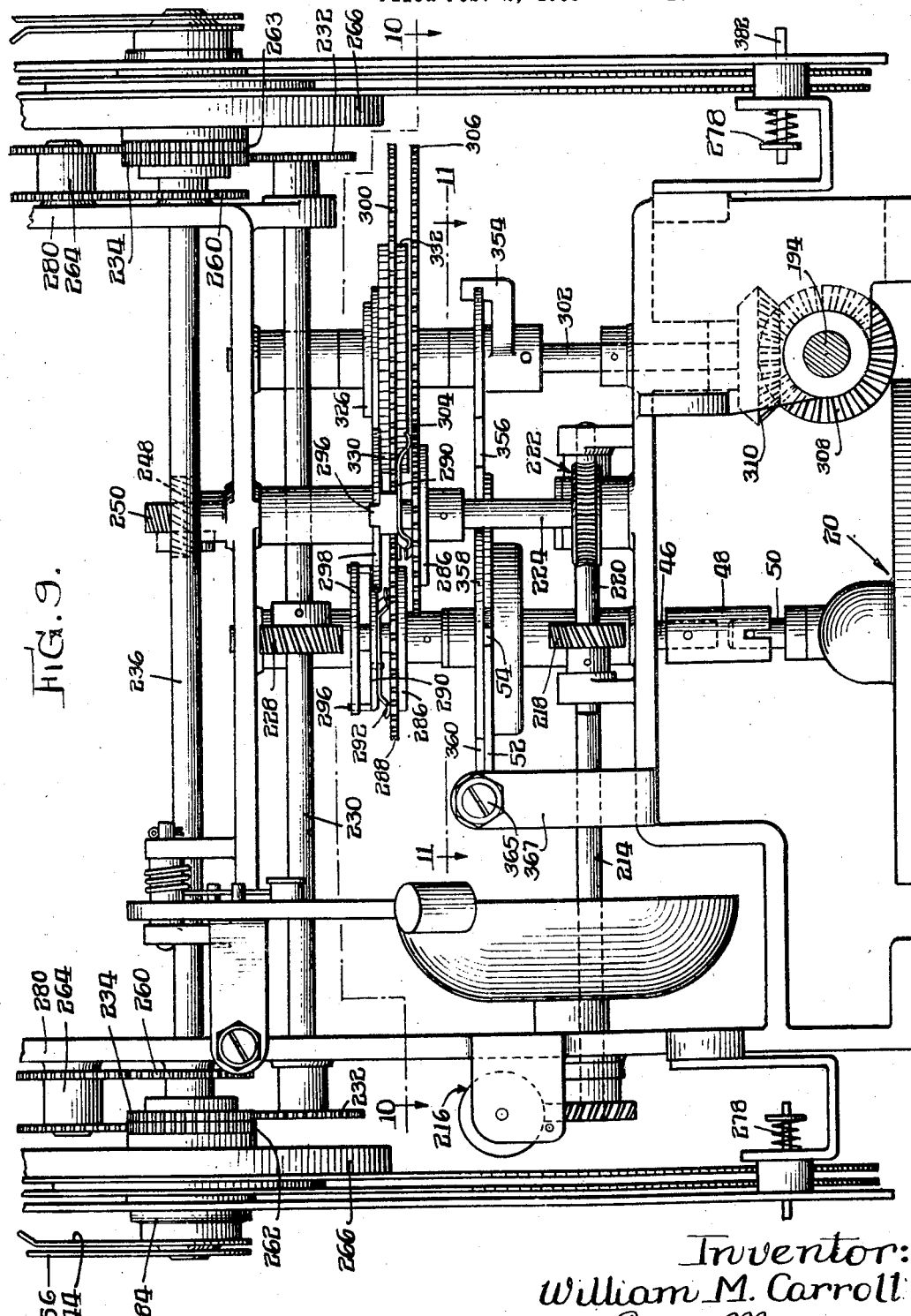

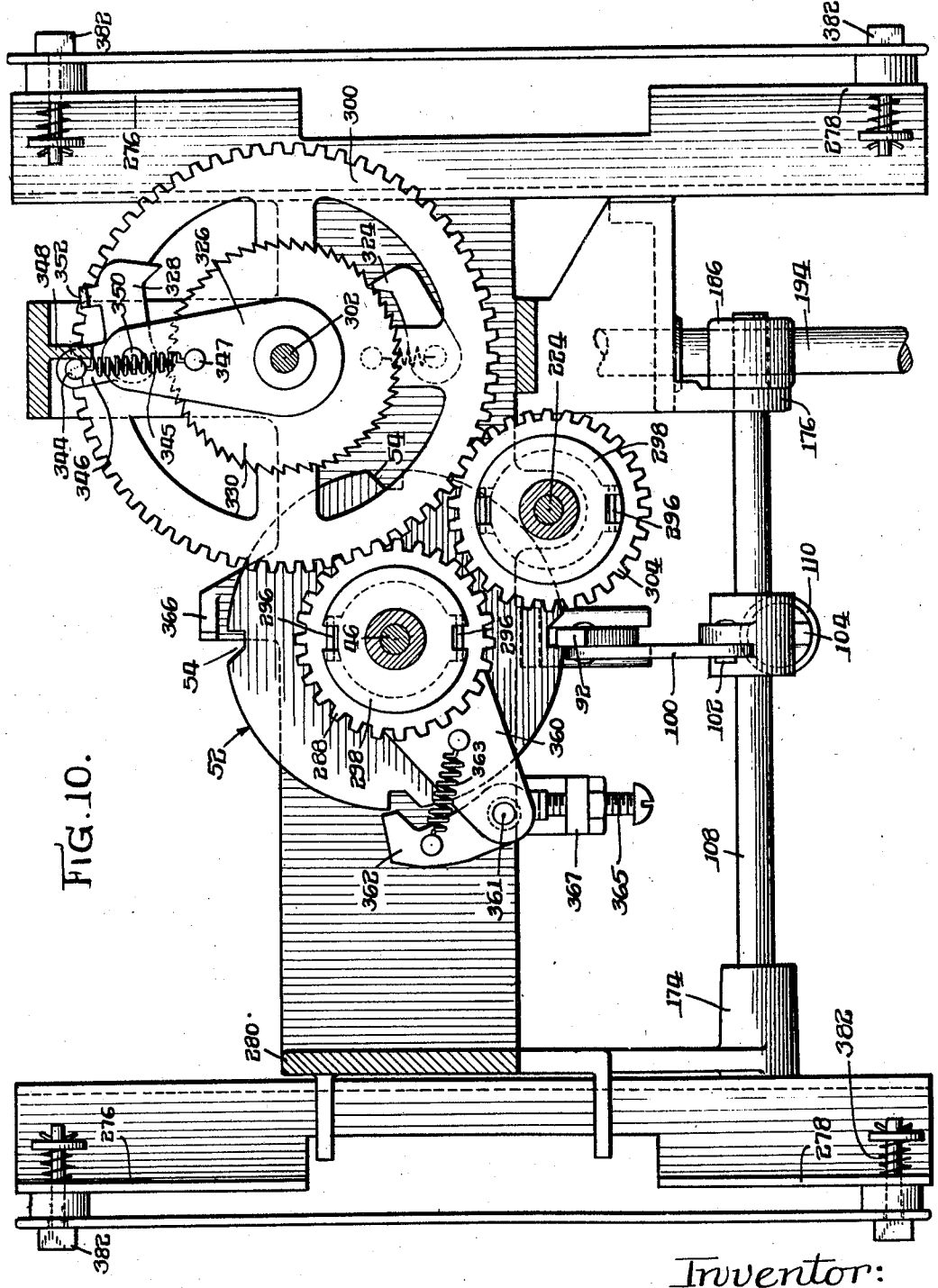

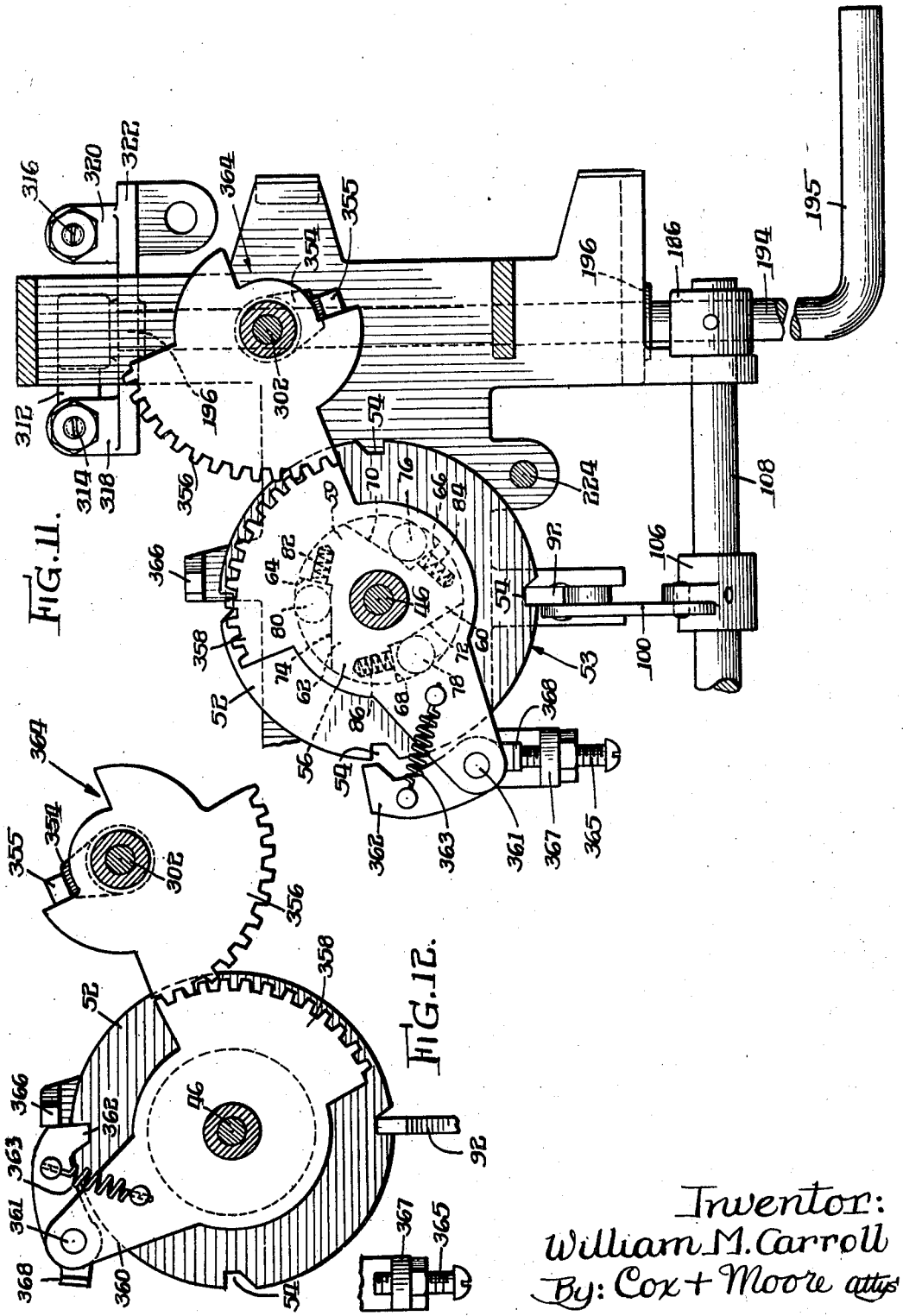

Aug. 15, 1939.  W. M. CARROLL  2,169,635
LIQUID DISPENSING APPARATUS
Filed Feb. 2, 1935  10 Sheets-Sheet 9
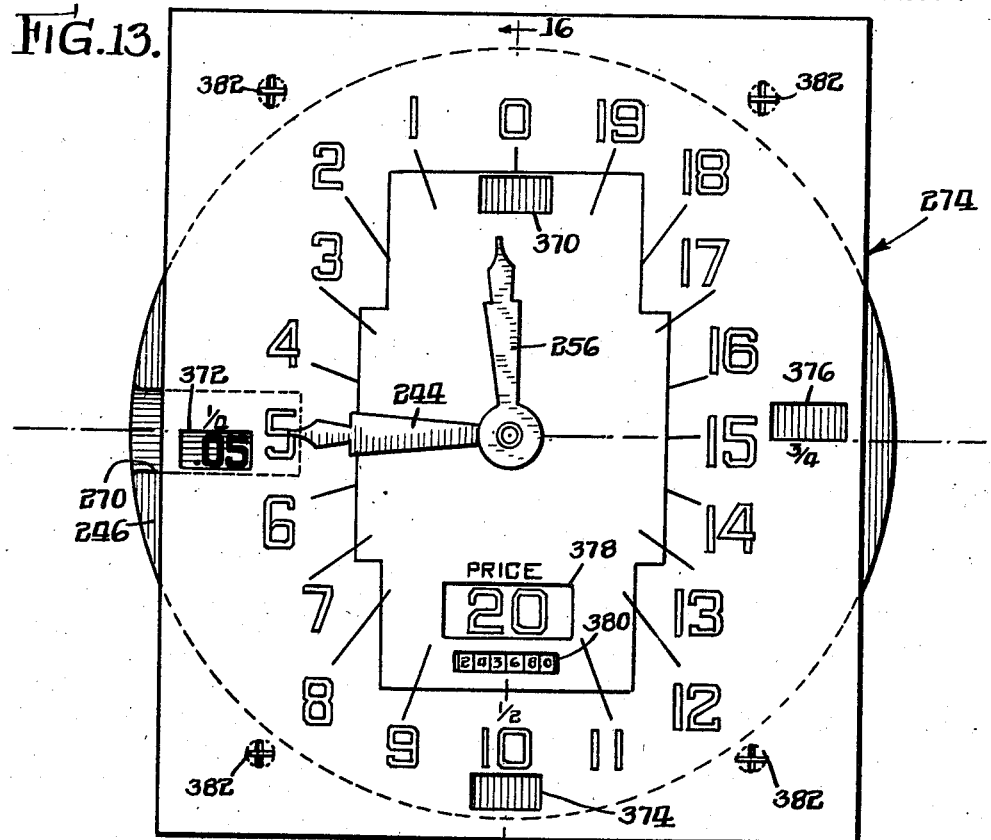
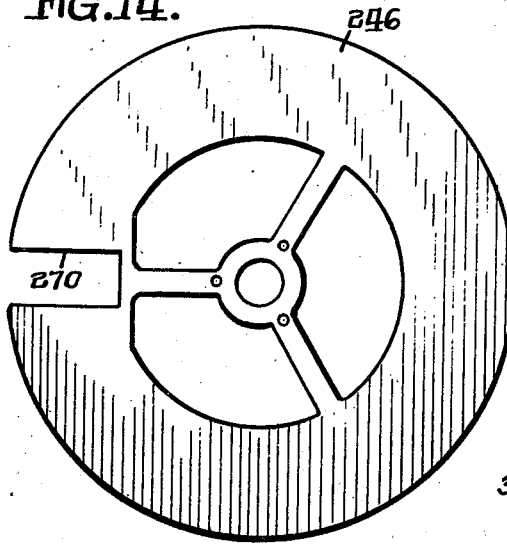
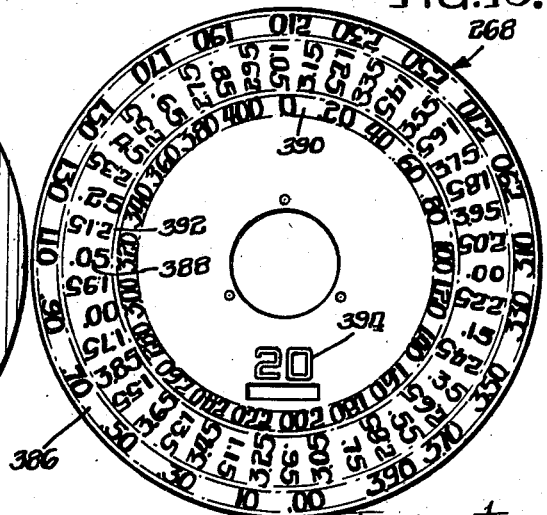
Inventor
William M. Carroll
By: Cox + Moore attys

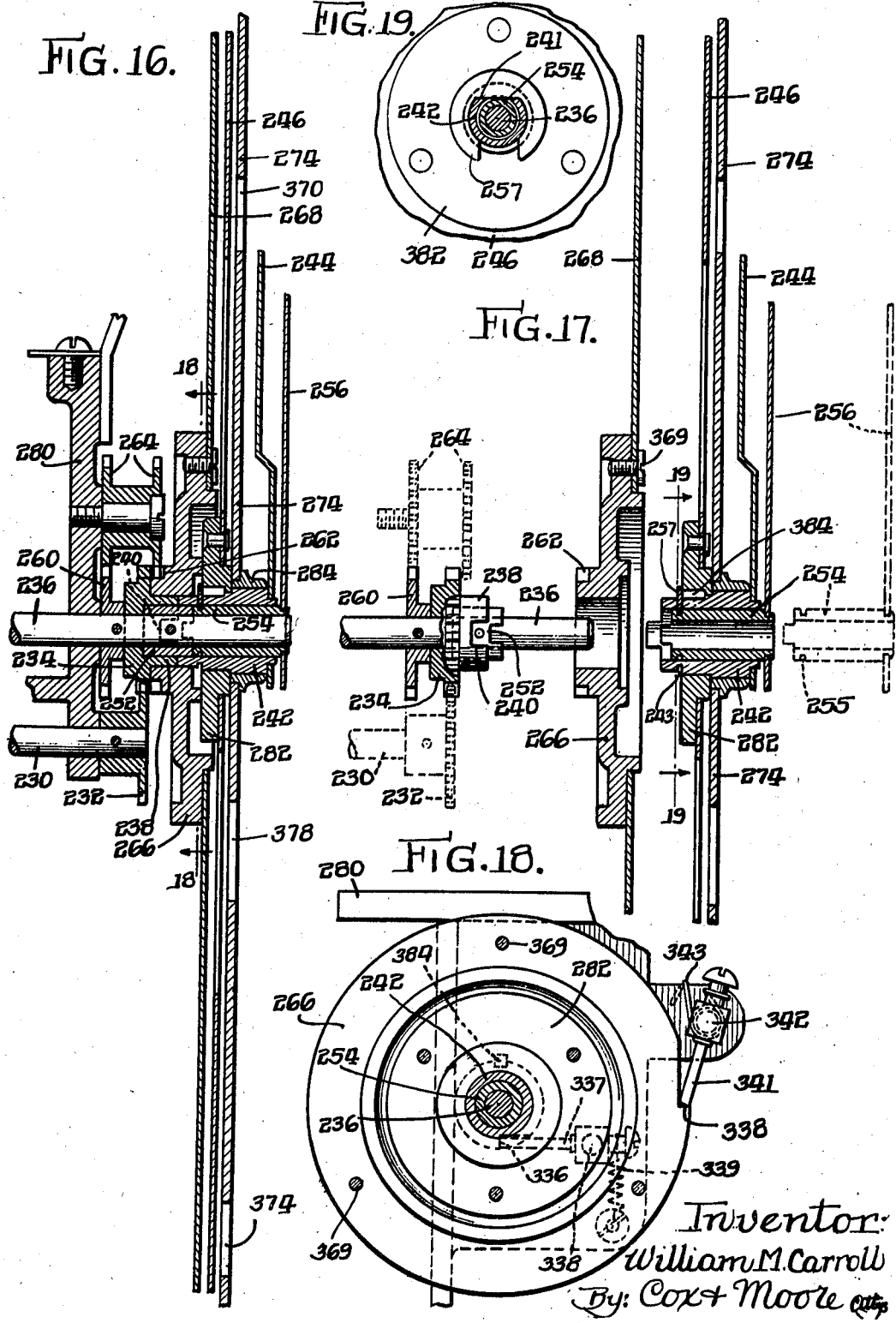

Patented Aug. 15, 1939

2,169,635

UNITED STATES PATENT OFFICE 2,169,635

LIQUID DISPENSING APPARATUS

William M. Carroll, Fort Wayne, Ind., assignor to S. F. Bowser & Company, Inc., Fort Wayne, Ind., a corporation of Indiana Application February 2, 1935, Serial No. 4,674

5 Claims. (Cl. 221—95)

My invention relates to a liquid dispensing device and more particularly to a gasoline dispensing pump having a meter in the dispensing line through which liquid is adapted to flow under pressure and wherein the flow of the liquid through the line is under the control of an operator so as to dispense any desired quantity or gallonage of liquid.

One of the main objects of my invention is to provide a liquid dispensing device particularly adapted for gasoline dispensing which is constructed and arranged so that the operator need watch only the liquid in the tank as the same is being filled and as soon as the liquid approaches within a predetermined unit of the full capacity of the tank, the operator can, from the nozzle end of the dispensing device, cause the automatic stopping of the dispensing at an exact and predetermined amount of liquid, whereby the necessity of the operator watching the meter clock is eliminated and whereby the operator's complete attention may be directed to the operation of filling the tank.

Yet another object of my invention resides in providing a dispensing device adapted to dispense predetermined and exact units of liquid wherein the exact amount to be dispensed may be selected by the operator after the initiation of the dispensing operation, the dispensing being accomplished preferably, but not necessarily from the nozzle end of the dispensing unit.

Yet another object of my invention resides in providing a liquid dispensing device, with means for stopping the liquid flow at any exact unit quantity of liquid or at any multiple of said unit quantity and including manually operable means to selectively permit stoppage at any desired multiple of said quantity.

Yet another object of my invention resides in providing a liquid dispensing device with means for stopping the dispensing flow at any of a plurality of exact dispensing quantities including manually operable means to selectively permit the stoppage at any desired one of said quantities.

Another object of my invention is to provide a liquid dispensing system including a volumetric displacement meter, said meter including means whereby in addition to recording the amount of liquid dispensed, the meter also automatically measures individual quantities in any number of accurate and exact basic unit multiples and whereby it may also accumulate at the will of the operator any number of such basic units of liquid dispensed and under its own control accurately measure said units.

Another object of my invention resides in providing a liquid dispensing device wherein control means are movable in synchronized relation with the meter and is provided with a series of controls thereon spaced apart in graduated relation, each corresponding with an accurate measured incremental unit of liquid measure, and wherein a clock mechanism is likewise synchronously driven and is provided with spaced apart graduated price indicia, each corresponding with one of said incremental units of measure or multiples thereof, together with means automatically stopping the dispensing flow at any one of said incremental units of measure and wherein means is provided so that the price indicia for said exact unit of measure will appear on the clock mechanism.

Among the objects of my invention are to provide a liquid dispensing device of the foregoing character wherein the flow of liquid is constantly under the command of the operator and wherein means is provided at the nozzle end of the pump and which is generally dispensing liquid into a receptacle disposed at some distance from the base of the pump, including instrumentalities whereby the flow of liquid through the pump will automatically stop at a predetermined, exact unit quantity and which quantity is adjustably variable at the volition of the dispenser and from the nozzle end of the device.

Still another object of my invention resides in providing a so-called pull-hose type of control which is constructed and arranged to start the dispensing operation and thereafter to cause the automatic cessation of dispensing when an exact unit quantity of liquid has been dispensed and particularly to provide a device of such character wherein the dispensing operator may, during the flow of liquid through the dispensing line, select the exact amount of liquid which he desires to dispense and whereupon instrumentalities will be put into operation automatically to cause a cessation of dispensing when said exact quantity of liquid has been dispensed.

Yet another object of my invention resides in providing such a mechanism wherein the selection of the quantity to be dispensed and the automatic control and stoppage of such dispensing is accomplished from the nozzle end of the pump.

Yet another object of my invention resides in providing such a device wherein after the predetermined amount of liquid has been dispensed, the operator can dispense a selected and exact additional amount of liquid by controlling the operation from the nozzle end and without the necessity of approaching the location of the pump pedestal.

Yet another object of my invention resides in the provision of such a type of mechanism wherein should the tank being filled overflow, the dispensing flow may be immediately stopped and wherein mechanism is provided for resetting the dispensing mechanism so as to thereafter automatically dispense exact units of liquid in succeeding or successive dispensing operation.

Yet another object of my invention resides in providing a dispensing mechanism which includes a control means operable from the nozzle end of the dispenser, enabling the operator to dispense any exact unit quantity of liquid he desires and which mechanism will automatically stop the dispensing when such exact unit quantity has been delivered wherein the pump or other operative means for forcing liquid through the dispensing line under pressure is started and stopped from the control at the nozzle end of the pump thereby saving consumption of power by having the operation of the motor for the pumping means run only during the duration of the dispensing period.

Yet another object of my invention resides in providing a device of the character disclosed wherein the termination of the dispensing operation is under the control of the operator at the nozzle end of the pump and wherein the dispensing will teminate at any exact unit volume of liquid and wherein means is provided for diminishing or slowing down the rate of flow of the liquid as the termination of the dispensing operation approaches, whereby to give a more exact and facile control of the dispensing operation.

Yet another object of my invention resides in providing, in a dispensing pump of the foregoing character, a spring loaded check valve disposed in the nozzle end of the dispensing unit which will close as soon as relieved of pressure when the flow stops whereby preventing the loss of liquid in the hose during the momentary period that the nozzle valve remains open after the flow has been stopped by the maintained control valve in the dispensing line.

Yet another object of my invention resides in providing a pump of the foregoing character with instrumentalities cooperating with the hose hook or the support whereby the entire pump mechanism is locked when the control handle is in normal or "off" position.

Yet another object of my invention resides in providing a dispensing pump of the foregoing character wherein instrumentalities are provided for resetting the quantity indicators to zero prior to the initiation of the subsequent dispensing operation and the starting of the pump motor.

Yet another object of my invention resides in providing as a particularly adaptable instrumentality in cooperation with the device for delivering exact unit quantities of liquid, a novel type of clock mechanism adapted to indicate exact unit quantities of liquid such, for instance, as exact gallons and exact quarts dispensed, together with mechanism automatically to indicate the price per unit and the price of the total amount of such units of liquid dispensed by the pump.

Yet another object of my invention resides in providing novel features of construction of such a clock mechanism whereby certain parts thereof may be speedily removed and replaced for price interchange and/or repair, replacement or assembly.

Yet another object of my invention resides in providing a novel type of gasoline dispensing pump mechanism wherein the dispensing operation is subject to the opening and closing of a control valve which is automatically operated to start and stop from the nozzle end of the dispensing mechanism and which includes a movable element adapted to be operated by the measuring device such, for instance, as a fluid displacement meter and which is adapted automatically to stop the dispensing operation when a predetermined exact quantity of liquid has passed through the meter.

Yet another object of my invention resides in providing mechanism of the foregoing character wherein the control mechanism is operatively connected to the hose and is operable by the well known pull hose method.

Yet another object of my invention resides in providing a novel type of clock mechanism, per se, constructed and arranged to indicate exact unit quantities of liquid and also to indicate the price per unit and/or the price of the total amount of such liquid dispensed by the pump.

Yet another object of my invention resides in providing a dispensing device which will dispense a predetermined and exact quantity of liquid through the nozzle, together with instrumentalities manually operable from the nozzle for controlling the initiation of the dispensing operation and/or for controlling the termination and/or re-starting of the dispensing operation.

Yet another object of my invention resides in providing a dispensing device which includes a dispensing line terminating in a nozzle valve having a manually operable control member and through which dispensing line liquid under pressure is adapted to be forced through a liquid measuring device such as a volumetric displacement meter and wherein a control valve is inserted in the line and is adapted to be operated by instrumentalities automatically operable at the volition of the dispenser from the nozzle and of the line for opening and/or closing the control valve and in a manner to dispense exact and predetermined volumes of liquid.

Yet another object of my invention is to provide a dispensing system wherein a control valve is provided in the dispensing line together with means for automatically closing said valve at an exact time and whereby to dispense an exact and predetermined unit or multiple unit volume of liquid, and particularly wherein said valve is provided with a spring for closing the same, the valve and the spring being constructed and arranged so that the valve, in addition to functioning as a dispensing cut-off, also acts as a foot valve to keep the dispensing system primed and/or wherein the valve and its spring functions to hold the head of liquid in the system so as to keep the sight-glass full, the tension of the spring being adjusted to accomplish this, and yet capable of releasing upon the creation of an exterior pressure in the dispensing system, due to the expansion of gases in the same, and whereby to open slightly to relieve this excess pressure.

Yet another object of my invention resides in providing a control valve at the inlet side or discharge side of the meter which control valve is arranged to prevent any undue strain being placed upon the meter being due to the pressure of the liquid in the system.

Yet another object of my invention resides in providing a liquid dispensing system with a control valve for stopping the fluid flow and in addition thereto, with a nozzle valve control together with means operable from the reset of the clock mechanism of the meter for automatically closing the control valve in the event that the control valve has remained open as a result of closing the nozzle valve.

Still another object of my invention resides in combining the spring-closed control valve and foot valve for stopping flow through the dispensing line, and for maintaining the dispensing line, including a sight-glass full of liquid after the dispensing operation, with pressure relief mechanism, whereby spring means is utilized, of such strength that it will be sufficient easily to close the combined control and foot valve, particularly by remote control means, and yet at the some time will be of sufficient strength to maintain the valve closed under sufficient tension to provide a considerable pressure in the dispensing line so as to maintain sufficient pressure in the sight discharge or glass so as to keep the gasoline above vapor pressure.

Yet another object of my invention is to provide a spring control mechanism for permitting the combined control valve and foot valve to close easily for easy operation either by hand, or particularly by remote control means, while at the same time providing sufficient tension to maintain the slight discharge under an adjustably selectable range of pressures, depending upon the temperature and type of gasoline dispensed, thereby preventing the dropping down of the level in the sight glass.

Yet another object of my invention resides in providing a changeable tension means for the combined control valve and foot valve for the liquid flow line, whereby a predetermined adjustment of spring means is utilized for closing or assisting in closing the control valve to stop the liquid flow, and whereby after flow has stopped, a spring means of greater tension is utilized for maintaining the combined control and foot valve in closed position, but which is yieldable under greater pressures whereby to maintain a greater pressure in the sight glass, but which spring means will relieve to permit the escape of some of this pressure when necessary.

Yet another object of my invention resides in providing an alternative arrangement of spring means for the combined control and foot valve for the liquid dispensing line, which arrangement provides a spring means for closing the control valve to stop the dispensing, and wherein upon the actuation of the resetting mechanism, a spring means of greater tension is utilized for maintaining the control valve closed under higher tension whereby the first-mentioned spring means is utilized for stopping the flow in a more facile and easy manner, as from a remote control station, and whereby the greater spring pressure is utilized for maintaining a higher pressure in the liquid dispensing line, as when the pump is standing idle between dispensing operations.

Yet another object of my invention resides in providing, in connection with the liquid dispensing system having a sight-glass, a manually controlled valve controlling the flow of fluid through said line, having spring mechanism of relatively easy tension so as to permit closure of the valve in an easy manner from a remote control station, and having also spring means of relatively greater tension, together with means for automatically maintaining the valve closed by the spring means of greater tension after the valve has been closed by the spring means of lesser tension, whereby the spring means of greater tension will maintain the liquid in the sight glass under greater pressure than could be provided for it by the spring means of lesser tension, and whereby said valve is adapted to yield to permit relief of said pressure in the sight glass when necessary.

Yet another object of my invention resides in providing a liquid dispensing device including a volumetric displacement meter and including a valve for controlling the dispensing through the dispensing line and including a pump for forcing the liquid through the line, together with control means for the valve and pump so that the pump is actuated after the valve is open, whereby the opening of the valve presents the minimum resistance to the action of the pump.

Yet another object of my invention resides in providing an arrangement whereby the valve closes before the pump stops, thereby permitting the force of fluid flow to assist the spring of the valve in closing the valve, thereby to accomplish quicker valve closing, thereby permitting accuracy of measurement, particularly in combination with the means included in my invention for stopping the fluid flow at exact and incremental units of volume or multiples thereof.

Yet another object of my invention resides in the provision in a pull hose system for the control of the dispensing operation of a dispensing control valve, and a pump control for forcing fluid through the dispensing line whereby the valve is opened and thereafter the pump started and/or wherein the valve closes before the pump stops, wherein the parts are interconnected and arranged to permit operation and control by the pull hose method in a more facile and expeditious manner and wherein less energy is required to actuate the control devices by the tension upon the hose as in pull hose operation.

These and other objects of my invention will be apparent from a perusal of the following specification when taken in connection with the accompanying drawings wherein Fig. 1 is a front view of one form of my improved type of liquid dispensing mechanism;

Fig. 2 is a side view thereof;

Fig. 3 is a plan section on the line 3—3 of Fig. 1;

Fig. 4 is a view of the changed position of the hose pull arm, spring tension assembly shown in Fig. 3;

Fig. 5 is a section on the line 5—5 of Fig. 3 showing the clock and hose pull arm mechanism;

Fig. 6 is a section on the line 6—6 of Fig. 5 showing the position of the stop mechanism for the resetting shaft;

Fig. 7 is a perspective view showing the mechanism controlled by the pull hose arm when in operating or dispensing position when in various positions of operation;

Fig. 8 is a diagrammatic perspective view of the preferred form of clock mechanism which I desire to use with the other features of my invention;

Fig. 9 is a front view partly in section, of a clock mechanism assembly;

Fig. 10 is a section on the line 10—10 of Fig. 9;

Fig. 11 is a section on the line 11—11 of Fig. 9 showing a portion of the reset mechanism;

Fig. 12 is a similar view showing a changed position of the set-back or reset mechanism;

Fig. 13 is a front view of the clock face;

Fig. 14 is a view of the shutter disc;

Fig. 15 is a view of the price disc;

Fig. 16 is a section on the line 16—16 of Fig. 13 showing the clock, shutter and price disc assembled;

Fig. 17 is an expanded view of the parts shown in Fig. 16;

Fig. 18 is a section on line 18—18 of Fig. 16, and

Fig. 19 is a section taken on line 19—19 of Fig. 17.

Referring now to the drawings in detail, I have illustrated my invention as applied to a generally conventional type of pump which includes an upstanding housing or pedestal 2 of any desired construction, shape or size, which pedestal, as is well known in the art, provides a housing for a supply pipe 4 adapted to connect with a source of liquid to be dispensed, such, for instance, as a gasoline or other liquid-containing reservoir. The pipe 4 connects to the inlet side of the pump 6 or other liquid forcing means, which in the present instance, is a rotary pump adapted to be driven by the motor 8 as by gearing 10. The motor 8 is provided with any type of switch 12 adapted to be controlled by a rod 14. The discharge side of the pump may connect with any type of air separator 16 which is adapted to discharge into a dispensing pipe 18, forming a part of the dispensing line, which latter, in turn, discharges into the liquid measuring device, preferably comprising a meter 20.

The meter 20 may be of any desired, well-known construction and is preferably of the liquid displacement type. I prefer to use any of the present commercial type of Bowser meters which are well known in the art. The bowl of the meter is shown in the dotted lines in Fig. 1. In general, it might be stated that this type of meter comprises a sequence of liquid displacement cylinders in which operate pistons. The liquid under pressure, flowing into the meter, will operate the pistons in succesion to rotate a shaft, which shaft, in turn, operates any type of clock mechanism to indicate at any instant, the amount of liquid dispensed.

In order to provide a primary control of the liquid passing through the dispensing line, I provide a control valve assembly which, in the present instance, I preferably place in the pipe 18 immediately at the inlet of the meter. This control valve assembly comprises a coupling 22, Fig. 7, connected to the line pipe 18 and provided with an internal threaded sleeve 24 forming a valve seat 26. A connecting pipe or coupling 28 connects with the inlet pipe 30 to the meter 20. The control valve 32 is constructed and arranged to seat quickly and with a minimum of operating exertion against a valve seat 26. To this end the valve 32 is provided with a stem 34 passing through a stuffing box 36 in the coupling 28. The outer end of the stem 34 is preferably provided with a pair of collars 38 and 38' forming therebetween an annular groove to receive opposed ears 37 formed on the inner walls of a bifurcation on the arm 182 hereinafter referred to. Collar 38' is normally maintained against the collar 38 which abuts against a set of adjustable lock nuts 39, by means of a tension spring 33. The upper end of the spring bears against a washer, which, in turn, abuts an upper set of lock nuts 39'. Obviously, by means of the adjustment of the two sets of lock nuts 39 and 39' the tension of the spring 33 may be suitably adjusted. The valve stem is likewise provided with a collar 40 abutting against a pin 41 fixed to the valve stem between which collar and a head 42 on sleeve 24 is located a spring 44, which is preferably only of sufficient strength to overcome the friction of the stuffing box 36, but which, if desired, may have a slight additional tension to assist the flow of liquid through pipe 18 under the action of the pump in closing the valve 32. When the valve is thus closed, spring 44 will be relieved of tension. The spring 33 is stronger than spring 44, and is arranged for definite co-operation with mechanism hereinafter referred to.

The control valve 32 and its associated mechanism have a three-fold function: first and primarily, it is a control valve for the dispensing operation having a fully open and partially open position to permit free flow or partial flow, and finally, complete closure to prevent any flow through the dispensing line, irrespective of the nozzle valve or any other control valve; secondly, it functions as a valve to keep the system primed and to hold the head of liquid in the system and keep the sight glass to a predetermined level, or what is known as "full"; and thirdly, it acts as a relief valve to open slightly to relieve the excessive pressure in the dispensing line and sight glass due to expansion of the fluids dispensed in the hot weather, or due to the creation of other additional pressures. The spring means or spring mechanism, operatively associated with this valve, is constructed and arranged to provide for and/or to permit the easy opening or closure of this valve, and particularly by means of remote control mechanism, operated, for example, from the nozzle end of the dispensing system, and yet which spring means is likewise operative to maintain the valve closed under a relatively strong tension, which tension is of sufficient strength to maintain in the dispensing hose and particularly in the sight glass a sufficient pressure so as to prevent the gasoline in the dispensing line from vaporizing under different temperature conditions with the result that the level of the gasoline in the sight discharge will lower, which, of course, is objectionable. In addition, this spring mechanism and associated devices is constructed and arranged to permit the control valve to yield after dispensing has ceased to relieve any extraordinary pressure which may be created in the dispensing line and in the sight glass.

Means is provided, in my invention, for opening the control valve and also, if desired, for starting the pump motor from the nozzle end of the dispensing outfit, and means is also provided, actuated and controlled from the nozzle end of the outfit or pump, for causing the automatic closure of the control valve and/or stopping of the pump motor under the constant will of the operator so that the operator may, during the flow of the liquid as in the dispensing operation, select a predetermined, exact quantity of liquid measurable in preferably standard unit amounts, and wherein the dispensing will automatically stop after said exact unit measurement of liquid has been dispensed. For instance, if, during the dispensing operation, the purchaser should desire five gallons of liquid, the operator may, after starting the flow of the liquid, cause the dispensing of this exact amount, and no more, without shutting the nozzle valve. In short, even though the nozzle valve remains open, no more liquid will flow after the exact five gallons of liquid has been dispensed and/or if desired, the pump will automatically stop. So also, means is provided so that should the purchaser change his order and desire an additional gallon or more of liquid, dispensing may be immediately resumed by operation of the control means solely from the nozzle end of the pumping device and without the necessity of the operator approaching the pump pedestal, and upon resumption of dispensing, and when the exact additional amount of liquid desired has been dispensed, dispensing operation will again automatically stop. In the present invention I have provided means for accomplishing this automatic control of predetermined exact unit dispensing by means of a pull hose control operation.

One form of means for carrying out the broad principles of my invention comprises the provision of a device either driven by the meter shaft so as to rotate therewith and in timed relation thereto, and in a definite predetermined manner, as, for instance, in such a manner as to cause one cycle of means or one complete rotation of the device in timed sequence with the delivery of one unit of measurement of liquid through the meter, such, for instance, the measurement of one gallon of liquid by the meter, or wherein the device is operable by a prime mover but is controlled by the operation of the meter so as to produce the same result; in short, the completion of a predetermined movement of this device to correspond with the measurement of a predetermined volume of liquid such, for instance, as one gallon. In the present instance I have shown, as a simple means of accomplishing this, a shaft 46 (see Figs. 5, 7 and 8), which by means of a coupling 48, is adapted to be driven from the meter shaft 50. The preferred arrangement in the present instant is that shaft 46 will make one complete rotation for each gallon of liquid measured by the meter. It is obvious, of course, that other units may be selected, if desired.

In connection with the operation of this shaft 46, means is provided for stopping it at an exact point in its rotation to close the control valve to correspond with an exact amount of liquid dispensed, for instance, means is provided for selectively stopping the rotation of this shaft and hence for closing the valve at each or any one quarter rotation thereof, which will correspond with each quart of liquid being measured by the meter. Obviously by selecting the capacity of the meter and the means used in connection with the rotating shaft 46, any desired unit of volume or money value may be secured or selected. In the present instance I have provided the shaft 46 on which is freely rotatable a disc or control element 52 which, in the present instance, is provided with four notches 54 arranged equidistantly about the periphery of the disc, 90 degrees apart, and corresponding in selected unit measurement of volume or money value so that the movement from one notch 54 to the next notch 54 represents an operation of the meter in measuring one incremental unit volume of liquid such as one quart of liquid or one money value unit, as 25 cents worth of liquid to be dispensed, provided the liquid being dispensed is at the rate of 20¢ per gallon.

Means is provided for driving the notched disc 52 from the meter shaft 46 which comprises a roller clutch mechanism in the form of a disc 56 keyed as at 58, Fig. 5, to shaft 46 to rotate therewith. As shown clearly in dotted lines in Fig. 11, this disc or clutch member 56 is provided with a plurality of outwardly extending arms 59, 60 and 62, each of which is provided with a face 64, 66 and 68 extending radially from the center of the shaft 46. In addition, each face 64, 66 and 68 is provided with an angularly extending face or slot or cut-out formed by a face or wall 70, 72 and 74 forming a cut-out or recess or pocket in which a roller 76, 78 and 80 is seated. Each wall 64, 66 and 68 is provided with a bore in which is located a spring 82, 84 and 86, which normally tends to urge the roller 76, 78 and 80 away from the face 64, 66 and 68 and into contact with the angularly disposed wall or face 70, 72 and 74 and the inner periphery of the wall or face 88, see Fig. 5, of a housing ring 90 disposed on the underside of the slotted disc 52 and rigidly adapted to rotate therewith. The disc 52 and the ring-like housing 90 are formed together or may be welded together.

In the operation of this device, when the meter shaft is turning clockwise, Fig. 11, it will turn the disc-like element 52 clockwise through the engagement of the rolls 76, 78 and 80 against the faces 70, 72 and 74 and the inner wall 88 of the surrounding ring-like housing 90, whereby to form a clutching action to cause the rotational movement of the ring-like housing 90, and hence to cause the rotation of the slotted disc member 52 rigidly carried thereby and therewith.

Means is provided for controlling the dispensing action by instantaneously closing the control valve, which means includes the slotted disc 52 which is turned by the extension 46 of the meter shaft. In the present instance this comprises a valve actuating or releasing control or finger 92 pivoted as at 94 to a bracket 96 mounted on the frame of the device. This control of finger 92 is operatively connected as by means of a pivotal pin 98 to a link 100 which, in turn, is pivoted at 102 to a lever 104 mounted as by means of the hub portion 106 to a shaft 108 so as to turn with said shaft 108 when the latter is turned. The lower portion of lever 104 is provided with a rounded head 110 preferably of any form of a roller. This roller 110 cooperates with a lever 112 which passes through a slot 113 in the housing 2 of the pump, pivoted as at 114 to a suitable bracket 116 mounted in the pump housing. The inner end of the pivoted lever 112 is provided with a Y-shaped or forked cam means 118 arranged so that the Y—or the junction of the two laterally extending walls of the cam lie directly past the central portion of the roller 110 when the device is in normal or inoperative position. The outer end of lever 112 is provided with a yoke 120, in turn provided with a clamping device 122 which is formed to clamp around the hose 124. This hose, as shown in Fig. 1 of the drawings, is the usual, flexible dispensing hose of a well-known type of dispensing unit having its inlet end 126 connected with the usual sight glass 128 disposed at the exterior end 130 of the dispensing line, the other end of which is connected to the discharge side of the meter 20. The opposite end of the dispensing hose 124 is provided with a nozzle 132 provided with the usual type of guard 134 inside of which is located the nozzle valve lever 136 adapted when pressed to operate the dispensing nozzle valve 138. The dispensing nozzle is shown at 140 and is of usual construction. Inside of the nozzle proper there is provided a spring loaded check valve which will close under action of its spring as soon as relieved of pressure when the dispensing flow stops, thus preventing loss of liquid in the hose during the momentary period that the nozzle valve remains open after the flow is stopped by the control valve 32. This check valve is in dotted lines at 142.

Means is provided for maintaining the lever 112 in centralized, inoperative position. For instance, as shown in Figs. 3 and 5 I have provided two levers 144, and 146 disposed one above the other and pivotally mounted on pin 114. Each of these levers 144 and 146 has downwardly extending lugs 148, 150, which are adapted to engage the side of the Y-shaped cam on lever 112 and projection or ears 152 and 154 which are adapted dependently to engage stop pins 156 and 158 upstanding from the bracket member 116. The upper member 144 has a forwardly extending arm 160 having an upstanding perforated lug through which the end of the spring 162 passes, said spring at its other end being affixed to a pin 164 on any stationary part of the device. Correspondingly the other member 146 is provided with an inwardly extending arm 166 provided with the upstanding flange perforated to receive the end of the coil spring 168, the other end of which is connected as at 172 to a stationary part of the machine; the action of these two springs being equal and opposite tends to spread apart the arms 160 and 166 of the two pivotally mounted members 144 and 146 and to maintain the two projections 152 and 154 in normal position against the stops 156 and 158 with the depending stops 148 and 150 engaging the opposite sides of the Y or cam shaped inner end 118 of the pivotally mounted lever 112. The Y-shaped cam surface 118 of this inner lever is thus resiliently held in this centralized position.

Shaft 108 which is rotatable in bearings 174 and 176 is provided at one end thereof with an extension upon which is fixed a hub 178 having oppositely extending arms 180 and 182. The arm 182 is provided with a bifurcated end adapted to carry the pins 37 in engagement with the collar 38 of the valve stem 34 for the control valve 32. When shaft 108 is turned in a clockwise direction, the operating arm 182 will be depressed to push downwardly upon collar 38 whereby to open valve 32 against the tension of the spring 44. On the other hand, when the arm 182 is moved upwardly as in a counter-clockwise rotation, Fig. 7, of the shaft 108, the spring 44 of the valve will not only tend to close the valve, but will tend to push the arm 182 upwardly tending to rotate the shaft 108 in a counter-clockwise direction, and thus tending to maintain the roller 110 pressed against the Y-shaped head 118 of lever 112. It will also be understood that this same spring 44 in this instance, will tend to turn the shaft 108 so as to maintain the control finger 92 in sliding contact with the periphery 53 of the slotted disc 52. In this position the valve 32 will have partly closed. When a slot 54 comes opposite the control 92, the control will be in a position to jump into the notch to close the valve 32 completely.

In the preferred embodiment of my invention I have provided this extension 180 on the shaft 108 as a means for operating the switch for the motor which drives the pump whereby the pump will be automatically started at a certain predetermined time, in conjunction with the other operating mechanisms I have provided. It will be understood, however, that in some instances I may desire to operate the pump independently of the shaft 108, in which case a suitable connection will be made from the motor pump switch to a control lever mounted on the housing whereby the operator will walk up to the pedestal 2 and throw the control for starting the pump, and reversely, may throw the control in the opposite direction to stop the pump wholly independently of any other mechanism herein shown. Preferably, however, I desire to interconnect the pump switch controlling mechanism with the other mechanisms I am disclosing. Accordingly, the control rod 14 is connected by a lost motion connection to the lever 180, as shown in Fig. 1, and the rod is connected up to operate the usual type of switch running to the electric motor for the pump.

In my present invention I specifically connect the shaft 108 and the connection 14 leading to the pump switch and arrange the same in such a manner that the control valve 32 is opened before the pump is operated, conversely, the control valve 32 is closed before the pump is stopped. The fact that the pump begins to actuate after control valve 32 is opened, assists in the easy opening of the valve, particularly by the remote control mechanism. It will be obvious that if it were necessary to open the valve after the pump began operating, it would be necessary by a pull on the hose to open this valve, not only against the tension of the spring 44, but to this spring pressure would be added the force of the pump, which would be considerable.

By arranging the connections so that the valve is closed before the pump stops, I take advantage of the pressure on the liquid created by the pump to close and/or to assist the spring 44 in closing the valve, thereby establishing a very quick closure, which permits accuracy in measurement. Furthermore, by operating the pump and the valve by remote control, I am enabled to conserve operation of the pump until approximately the time that dispensing begins and ceases, thereby saving operation of the motor in by-passing when dispensing is not actually taking place. It is estimated that this arrangement will save approximately 50 to 60% of the electrical energy consumed.

The shaft 108 on its opposite end, is provided with a further extension having a hub 186 pinned thereto, which in turn is provided with an arm 188 depending therefrom, which registers with and may pass through a slot 190 formed in a disc 192 fixed on an arm or shaft 194, mounted in suitable bearings 196 of clock frame 200, whereby to permit finger 188 to move freely through the slot and thereby permit the shaft 108 to rock freely in a clockwise direction to open valve 32 and start the flow. The disc 192 is provided with a cam surface adapted to engage the side of the finger 188, which surface is constructed and arranged so that when delivery is complete, the operator must rotate the control handle 195 a distance of 180 degrees before hanging up the hose. In doing so, the cam surface of this disc 192 contacts finger 188 and imparts a slight counterclockwise rotation to the shaft 108 which will withdraw pins 37 from collar 38 and bring the spring 33 into action to maintain the valve 32 tightly against its seat.

Means is provided for confining the liquid in the dispensing line between the combined control valve, foot valve and relief valve and the nozzle valve, in such a way as to prevent vaporization. In the present invention, this is accomplished by confining the liquid in this section of the dispensing line in such a manner that there is no room for vaporization to take place. In general, the introduction of cold gasoline from the underground storage tank into a pump operating under high summer temperatures, will immediately tend to bring up expansion pressures, between the nozzle valve and the relief valve, between which the column of liquid is confined. Means must be provided by which any pressure built up therein must be relieved to prevent damage to the unit and also to minimize loss of measured liquid being relieved, or being pushed back through the relief valve, due to expansion. In my present invention I have arranged the spring 33 and provided the same with an adjustable tension mechanism whereby it will maintain the aforesaid liquid column full or substantially full under varying temperature conditions, and when dispensing various motor fuels, which have constantly changing vaporization characteristics. At the same time, the spring mechanism is arranged to permit the valve to open when an inordinate or predetermined pressure has been built up in this portion of the line, whereby to permit the valve to relieve this inordinate pressure, and then immediately to close so as to confine the column of fluid under the conditions hereinbefore set forth. In short, the tension of spring 33 is selected and the adjusting means is arranged so as to add sufficient tension to the meter control valve so that the pressure that will be generated by the change in temperature taking place in the liquid in the discharge line and hose will build up sufficient pressure in the sight discharge so as to keep the gasoline above vapor pressure. Thus, by confining the liquid under sufficient pressure, which results from expansion due to high temperatures, vaporization is prevented, and I have provided means for thus confining the gasoline to prevent vaporization and to prevent consequent lowering of the liquid level in the gauge and I have also provided means whereby should excessive pressure arise, the spring 33 will yield to permit the valve to open slightly to relieve this pressure.

The outer end of the shaft or arm 194 projects through an opening in the housing and at its outer end is provided with the angularly disposed end 195 which in one position is adapted to straddle or transversely pass across the upper open ends of the nozzle supporting hooks 198, which are spaced apart as shown to receive therebetween the body of the nozzle so that when the bent arm 195 is in the position shown in Figure 7, it will be impossible to place the dispensing nozzle on its support, but when the arm 195 is turned to the dotted line position shown in Fig. 7, the nozzle may be so placed on its support as when not in use. The nozzle supporting hook 198 is provided at its inner end near the plate 200, with a locking device to receive the lower portion of guard 134, for the nozzle. To this end it is slotted laterally as at 202, so that this lower portion of the nozzle valve can be slid laterally thereinto and is provided with an upstanding locking abutment 204 which is disposed behind the nozzle valve lever 136 when the nozzle is on its support, and a padlock may be suitably passed through openings 206 on the slotted abutment 202 so that when the nozzle is on its support, it will be locked therein and the nozzle valve lever 136 will be locked against operation by reason of the projecting or intervening abutment 204. Furthermore, since in order to place the nozzle on its support it has been necessary to turn the projecting arm 195 outwardly to dotted line position it will not be possible to turn this arm back to full line position as shown in Fig. 7 when the nozzle is in its position.

*The clock mechanism*

In certain instances, in connection with the mechanism hereinbefore described, I may desire to use the conventional type of meter indicating or clock mechanism which, as well known in the art, comprises the quart hand and the gallon hand adapted to be rotated by the meter shaft about a conventional gallon and quart dial for indicating the amount of liquid dispensed at any particular instance, and it is to be understood that my invention is fully capable of use with such a clock mechanism for liquid indicating mechanism. However, I prefer to utilize with the foregoing described portion of my invention, a particular, specific embodiment of a clock mechanism having broad and generic features of construction whereby means is provided for indicating at any instant the amount of liquid dispensed, in exact and integral units of measurement, for instance, as three gallons and one quart, or any other exact and complete unit of measurement. In addition, the clock mechanism is constructed and arranged to indicate the price per unit measured of liquid, for instance, in the preferred embodiment of my invention, the device will indicate the price per gallon and also if desired, the price per quart, if that be the basic measure selected. In addition, the clock mechanism provides the total cost of the total amount of the liquid dispensed as, for instance, if five gallons and one quart of liquid are dispensed, the total price for five gallons and one quart is indicated.

In addition, the clock mechanism is provided with totalizing means for indicating the total amount or volume of liquid dispensed during a predetermined period such as a day, week, month or year.

My improved clock mechanism is a very simple construction for accomplishing the foregoing features and others. I prefer to construct it with interchangeable discs which may be very easily placed into position or exchanged, and these discs are arranged in cooperation with other portions of the clock mechanism such as a dial face and a movable indicating means so that pre-computed figures involving a sequence of preselected unit amounts of liquid to be dispensed in combination with pre-selected price computations for such volumetric units, will be displayed upon the dial face in a manner so as correctly to indicate at the particular price selected by that disc, the correct price in basic units, such as quarts, two quarts, three quarts and gallon units, the total price for the total exact amount of liquid dispensed. In addition, each exchangeable price dial will likewise show through a window of the dispensing dial of the clock the basic price for the day of the gasoline being dispensed, such as 20 $\frac{3}{10}$ cents per gallon, or the like. In addition, the clock dial is provided with a sequence of graduations in gallon amounts or exact divisions or increments thereof, from preferably zero to twenty gallons, and indicating means are provided and driven by the operating meter shaft for indicating the total gallons and quarts dispensed—a small hand being preferably provided to indicate the total number of gallons dispensed, as distinguished from one quart, two quart, three quart portions of a single gallon which are also suitably indicated by means including a large hand.

The clock mechanism comprises a novel and ingenious arrangement of discs, shutters and dials in cooperation with the movable indicating hands and movable dials so as to accomplish the foregoing.

Referring preliminarily to Fig. 8 for a general understanding of the arrangement of some of the parts, it will be noted that the extension 46 of the meter shaft has secured to it a spiral gear 210 meshing with another spiral gear 212 fast to another shaft 214 whereby movement is thus transmitted to a conventional gallon totalizer 216. Also meshing with the spiral gear 210 is a gear 218 on shaft 220 which communicates movement through the worm gearing 222 to the shaft 224. The ratio of the worm gearing 222 is 20 to 1, so that shaft 224 will make 1/20 of a revolution per gallon while shaft 46 will make one revolution per gallon, thus shaft 46 is for driving the fast hand and shaft 224 is for driving the slow hand. Shaft 46 has frictionally mounted on it at its upper end the spiral gear 226 meshing with spiral gear 228 fast to a horizontal shaft 230. On both ends of the shaft 230 are secured spur gears 232, Figs. 9 and 17, meshing with gears 234 loosely mounted on shaft 236. The gear 234 has a hub 238 which detachably connects through a clutch 240 with a hub 242 upon which is mounted the fast hand 244 and the shutter 246. The shaft 224 is frictionally connected with the spiral gear 248 meshing with gear 250 on the shaft 236. On the outer ends of shaft 236 are fixed the clutch sleeves 252 detachably mating with the clutch hub 254 which carries the slow hand 256. The hub 242 is provided with an annular groove 243. 242 also has a segment thereof cut away as shown at 241 in Fig. 19 so that the groove 243 at this portion passes entirely through the wall of this hub. In addition, the hub 254 is provided with an annular peripheral groove 255 which, when the hub 254 is in position, as shown in the full lines in Fig. 17, registers with the groove 243. A detachable resilient ring or split clip 257 is adapted to lie in the groove 243 of the hub 242 and is sufficiently narrow so that it lies in and interlocks with the groove 255 on the hub 254, thus detachably, but firmly, holding the hub 254 and its hand 256 in assembled relation to and within the hub 242 with its hand 244 and all in assembled relation to the dial 274. When this spring clip 257 is in position shown in full lines in Fig. 17, it likewise holds in position the detachable key or spline 384 which key, upon removal of the spring clip 257, may be detached so as to permit the removal of the flanged collar 282 from the hub 242 or, in other words, permits the complete separation of the hub 254 from the hub 242 and the removal of these members from the flanged collar 282 and the removal of all these from the dial plate 274. In short, through the instrumentality of the assembly means or spring clip 257, the entire assembly of the dial plate, the shutter 246 and the fast and slow hands 244 and 256 are held in unitary relation so that they may be removed from the hub 266 and from the driving clutches 238 and 252 so as to permit an exchange or replacement of another price chart 268 having a different set of indicia thereon. Also fixed to the shaft 236 is a spur gear 260 which communicates with the hub gear 262 through the straddle gear 264, the gear 262 is integral with the hub 266 on which is mounted the price chart disc 268. It is thus obvious that the fast hand and the shutter rotate in unison and the slow hand and the price chart disc operate in unison. The shutter 246 has an opening 270 which is radially positioned in line with the fast hand 244 so that the price is only visible through the opening in the face plate or dial 274 when the fast hand 244 is pointing to that opening.

The clock dial 274 is supported on brackets 276—278 mounted on the clock frame 280. The dial 274 is held in position by spring latches 384 so that the dial will be easily removable. It will be noted that hub 254 carrying the slow hand 256 is journaled loosely inside the hub 242 which carries the fast hand and the shutter. The hub 242 is loosely journaled in the bearing 284 which is part of the clock dial 274. It is therefore obvious that the clock dial assembly comprising the fast and slow hands and the shutter can be conveniently removed as a unit by reason of the clutch connection of the hubs 242 and 254, thus facilitating the changing of the price chart disc 268.

Resetting mechanism

The shaft 46 has fixed thereto the hubbed disc 286 while the spur gear 288 is loosely mounted on shaft 46 but is mounted in frictional contact with the fixed disc 290, which is maintained under compression by the spring 292 which, in turn, is held in place by the pin 294. The disc 290 has two bent-over projections 296 which clutch the corresponding notches in the hub disc 298, which has fastened thereto the spiral gear 226 previously referred to. The hub disc 298 is free to rotate on shaft 46 but is held against axial displacement thereon by a collar $226^1$. A pin $290^1$ is passed through the shaft 46 just above disc 290 so as to hold the disc 290 in a position in which spring 292 is compressed. A similar construction is provided for the slow hand shaft 224 which is journalled for free rotation in an elongated hub $298^1$ while a shaft $248^1$ carrying the gear 248 is pinned in the hub. The shaft 224 has fixed to it a friction plate 286 and the hub $298^1$ carries a clutch assembly which is identical with that mounted on the shaft 46. A pin $290^1$ passes through the shaft 224 and serves to maintain the spring 292 under compression. It will be noted that when the clock is operated by the meter, these friction assemblies will rotate with their respective shafts, the shaft 46 rotating at one revolution per gallon and the shaft 224 rotating at 1/20 of a revolution per gallon, both having the same direction of rotation. The gear 288 is enmeshed with the gear 300 loosely mounted on shaft 302, while the gear 304 on the shaft 224 frictional assembly meshes with the gear 306 also loose on its shaft 302. Assuming that shafts 46 and 224 rotate in clockwise direction, as viewed in Fig. 8, the gears 300 and 306 will be rotated in a counterclockwise direction. In order to reset the clock, the shaft 302 is rotated 180 degrees by the control handle 195 through the intermediary of a bevel pinion 308 meshing with another bevel 310 on shaft 302.

On the end of reset shaft 194 is fixed an arm or lever 312, Fig. 11, which is adapted to engage oppositely disposed threaded stops 314 and 316 threading through brackets 318 and 320 on a stationary arm 322 of the device. A spring 324, Figs. 5 and 6, is attached to the arm and to a stationary part of the device. The adjustment of the stops 314 and 316 is arranged to control the travel of pawl 362 whereby in retracted position it will not register with the notch in the slotted disc 52.

The arm 326 is fixed to shaft 302 so as to rotate therewith and carries pawl 328 which cooperates with the ratchet 330 which is integral with the gear 300. The gear 300 also has integral therewith on its underside, a ratchet 332 which cooperates with the pawl 334 which is mounted on gear 306. It will be seen that when the shaft 302 is rotated 180 degrees in a clockwise direction, the pawl 328 will engage ratchet 330 and rotate gear 300. Also, the ratchet 332 will engage pawl 334 and rotate the gear 306, which action will rotate the gears 288 and 304 on shafts 46 and 224 in a counterclockwise direction. The meter shaft 46 being maintained stationary, the gear 288 will slip on the disc 286, but will rotate the gear 226 and thence through gearing 226 and 228 will rotate shaft 230 which is mounted thereon, which through gear 232 rotates gear 234 and thence through clutch 240 which rotates the sleeve 242 that carries the shutter assembly and the fast hand. A notch 336, Fig. 18, is formed on the flanged collar 282 which carries the shutter and fast hand, which notch engages stop pawl 337 pivotally mounted on the frame at 338 and held in engagement with the flanged collar by spring 339.

A similar notch 338 is provided on the outer periphery of the flanged hub 266 which carries the price disc 268 and through the clutch 252 controls the slow moving hand 256. This notch engages stop arm 341 pivotally mounted on the frame at 342 and held in engagement with the notched collar 266 by spring 343. When the shafts 230 and 236 have been brought to zero and held against any further reverse rotation by the stops 337 and 341, the gears 288 and 304 will slip on their respective friction plates during the remaining travel imparted by the control handle 195.

The pawl 328, Figs. 8 and 10, carried by the arm 326 has a spring 340, one end of which is fastened to a pin 342 in the arm 326 and the other end is fastened to the pin 344 in an outwardly projecting arm 346 of said pawl. The clock frame 280 has a projection 348 extending into the path of travel of the spring pin 344 which acts as a stop for the arm 326 and causes the outer end of spring 345 to travel over the center 350, which is the pivot of the pawl 328, thus holding the pawl 328 out of engagement with the ratchet 330 during the time that the clock is in operation. An ear 352 on the pawl 328 is disposed to strike the projection 348 when the arm 326 is rotated counterclockwise. This throws spring 345 to the other side of center 350, thus conditioning pawl 328 to cooperate with the ratchet 330 when resetting occurs. It will be noted that during the operation of the clock, the ratchet 332 fastened to the underside of the gear 300 will travel away from its cooperating pawl 334 for the reason that the ratchet 332 will rotate 20 times faster than the gear 306 on which pawl 334 is mounted. The ratio between the set back gears of shafts 46 and 224 and the set back gears 300 and 306 on shaft 302 is such as to impart a full revolution to shafts 46 and 224, plus sufficient over-travel for the engaging and disengaging of the pawl 328.

The operation and function of the meter control disc 52 and the dispensing control 92 is the same as described hereinbefore. The disc 52 is driven by the clutch rolls 76, 78, 80 as before described. In the event that the pump is stopped between the positions of the notches 54 on the disc 52, disc 52 is reset at the end of the transaction when the control handle 195 is rotated out of interference with the hose hook. This resetting mechanism comprises an arm 354 fastened to the shaft 302 having an upstanding portion 355 to actuate the loosely mounted segment 356 which meshes with a segment 358 loosely mounted on the shaft 46. The segment 358 has an arm 360 carrying at 361 a pivotally mounted pawl 362 pulled inwardly toward the edge of disc 52 by means of spring 363. A stop 365 mounted on the bracket 367 is disposed in the path of movement of the upstanding lug 368 on the rear end of pawl 362. The stops 365 and 368 are in engagement when the meter is operating as shown in Fig. 11. A portion of segment 356 is cut away as at 364 so that the arm 360 and pawl 362 will travel through an arc of 90 degrees, while the arm 364 travels 180 degrees. This will cause the disc 52 to be reset and/or returned to its zero position through the action of pawl 362 engaging a notch in the disc 52 and rotating the disc in a clockwise direction. The projection 366 on the clock frame 280 is a stop for the pawl 362 which sets the disc 52 in accurate alignment with the index finger 92.

The clock dial comprises a stationary, preferably substantially square plate having four slots, one at each corner through which pass the fastening pins 282 for holding square shaped plate 274 detachably on the stationary frame of the pump casing. This face plate or dial 274 is provided first with a central opening through which passes the hub assembly 284 and the cooperative portion shown in Fig. 16 of the drawings, whereby the fast and slow hands may be operatively fastened on the front side of the dial for movable relation therewith. In addition, and cooperating with the path of movement of these fast and slow hands, the dial is provided with a series of gallon or other unit of liquid measure calibrations as herein shown, extending in a counterclockwise direction on one side and in clockwise direction on the other side from zero to nineteen, making from one to twenty gallons on a complete rotation of the slow hand. The spacing between the sequence of numbers from 1 to 2, and 2 to 3, etc., is such to permit the slow-moving hand to stop at the quarter, half and three-quarter marks therebetween to correspond with the rotation of the fast hand, which will move a complete rotation as the slow hand moves from zero to one, or from one to two, whereby the fast hand will indicate the quarts, which means the quarter gallons. In addition, the dial is provided with four slots 370, 372, 374 and 376 which are disposed at the places indicated at Fig. 13 of the drawings. The upper slot 370 is placed immediately beneath the zero gallon position; the slot 372, which indicates the one quart position, is placed immediately below the center diametral line passing through the axis of the lines and to the left of the dial. The slot 374 is placed immediately below the 10-gallon mark at the outermost periphery thereof, and the slot 376 is placed to the right of the disc and just above the horizontal diametral line through the center of the axis of revolution of the hands. The slot 374 indicates the two-quart measurement and the slot 376 indicates the three-quart measurement.

In addition, the dial is provided with a slot or window 378 which is located somewhat below the central axis thereof. This window is for the purpose of disclosing the price per gallon which is in effect at any particular time. In addition, immediately below the window 378 is a smaller or narrower window 380 through which the totalizer indication is viewable. The indicia or word "Price" is placed on the dial 274 immediately above the window 378. The indicia ¼ is preferably placed on the dial immediately above the window 372. The indicia ½ is placed immediately above the window 374 or immediately below the same, and the indicia ¾ is placed immediately below the window 376.

Assembled immediately behind the dial 274, as shown in the assembly in Fig. 16, is the shutter disc shown in detail at Fig. 14 of the drawings. This shutter disc 246 is mounted on a flanged collar 282, which is keyed to the hub 242 as at 384. This hub also carries with it the fast hand 244 so that the fast hand and this shutter disc rotate in unison. The shutter disc is provided with an inwardly extending recess, slot or window 270 as shown in Fig. 14, which recess 270 is adapted to cooperate with the slots 370, 372, 374 and 376 so that the disc, when rotating past these slots, will permit observation of any indicia registering with these windows 370, 372, 374 and 376.

Immediately back of the shutter 246 in the assembled position shown in Fig. 16, is a price disc 268 which, as shown in Fig. 17, is detachably mounted as by means of studs 369 on a disc-like hub 266. This price disc is adapted to revolve with the slow hand 256 by means of clutch sleeves 254 which telescope in the manner illustrated in Figs. 16 and 17 of the drawings. Regarding the price disc shown in Fig. 15 it will be seen that it is comprised primarily of three concentric rows of price computations, an outer row 386, an intermediate row 388 and an inner row 390. The intermediate row 388 in turn comprises two separate series of computations or figures 388 and 392, alternately arranged. That is, the sets of figures in series 388 are alternately arranged with respect to those in series 392. Further, the figures of series 388 are inverted with respect to those of series 392 as clearly appears from an inspection of Figure 15. Series 388 includes such figures as 3.25 and 3.05, whereas series 392 includes the figures such as .55, .35 and .15.

The groups of figures in series 386 are adapted to appear through the two-quart window 374. The group of figures in series 388 are adapted to appear through the one-quart window 372; the inverted group of figures in series 392 are adapted to appear through the three-quart window 376, and the group of figures in series 390 on the segments are adapted to appear through the window 370. For instance, regarding Fig. 15, it will be seen that when the slot 270 in the shutter disc registers with the one-quart window 372, the figure .05 in the intermediate line will be viewable through the one quart window and when the slot 270 has moved to register with the window 374, the figure 10 in the outer row will appear therethrough and when the slot 270 has moved to register with the three-quart window 376, the figure 15 in the 392 series in the intermediate row will appear through the window 376 and finally, when the shutter slot 270 has moved around to register with the window 370 the figure 20 appearing on the sequence row of the 390 series will appear through the window 370, which will indicate that one gallon or four quarts at 5¢ per quart, or 20¢ per gallon has been dispensed. This will cover the first revolution of the fast hand, or the movement of the slow hand from zero to 1 gallon. The slow hand and the price disc revolve 1/20 of a revolution for one gallon. This will bring the price 25 on the intermediate row of figures (see Fig. 15) opposite window 372 when the cutout slot 270 in the shutter 246 registers therewith, and 30 will move over to the place formerly occupied by figure 10 and 35 to the place formerly occupied by 15, et cetera.

A further inspection of this chart makes further explanation unnecessary.

The price disc 268 is provided with a price per gallon, such as 20¢ as indicated at 394, which will show through window 378 to permit the use of interchangeable price discs with different prices thereon, such as 21¢ or 21½¢, each disc carrying on its periphery, as hereinbefore described, a corresponding set of computations for the one quart, two quart, three quart and four quart sales.

Operation

It will thus be seen that I have provided an improved type and distinctly novel construction of dispensing device, wherein exact and predetermined amounts of liquid may be dispensed preferably by a single operator without the necessity of watching the dial. For instance, if a motorist should drive up to a gasoline dispensing pump and ask for his tank to be filled up, the operator will, in serving the motorist, first remove the hose nozzle from its hook 198 and then shift the control 195 to the full line position as shown in Figure 7. This will reset the fast and slow hands to zero indicating position. The nozzle having been removed from the hook or support 198, the operator walks from the base of the pump pedestal to the receiving tank which may be ten or fifteen feet from the pedestal. He unscrews the cap from the tank, inserts the nozzle spout and pulls on the hose from the nozzle end, and maintains the tension. The tension or pull usually is exerted with the free hand as distinguished from the hand which is occupied with the task of operating the nozzle valve. When the hose is pulled, this by means of the lever 112, shifts the arm 104 (see Fig. 7) to rotate the shaft in a clockwise direction, whereby to depress the valve stem and open the control valve 32 against the tension of its spring 44. Subsequently the arm 180 through the connection 14 starts the pump. The operator then opens the nozzle valve so that the pump, instead of by-passing, will then force the liquid through the dispensing line, through the meter, thereby actuating the meter, and the meter shaft and meter extension shaft 46. It will be remembered that upon the opening of the control valve 32 by turning movement of the shaft 108, the control finger 92 has been withdrawn from its registering slot 54 in the control disc 52 so that the control disc 52 on the meter extension shaft 46 is free to turn. Subsequently, when the meter starts in operation, the control disc 52 will turn and will continue to turn during the dispensing or as long as the operator maintains tension upon the hose and the nozzle valve open. Meanwhile the fast and slow hands and the shutter and price chart are turning in synchronized relation with the movement of the meter shaft and the quarts and gallons, or any other unit of measure are being not only measured by the meter, but are being indicated through the windows of the dial plate, as well as by the movement of the fast and slow hands with respect to the indicia on the dial plate. However, the dispensing operator need not look at the clock of the meter. All he has to watch is the liquid level in the tank and as soon as the liquid level approaches within a unit of measure of its full capacity (a quart in this instance), he then releases the tension or pull upon the hose, which functions immediately as hereinbefore described, to permit the finger 92 to move into engagement with the imperforate peripheral portion 53 of the slotted disc 52 so that and whereupon the control valve is brought to a somewhat closed position whereby to cut down the liquid flow through the nozzle. The meter continues to operate, and the slotted disc 52 likewise continues to turn until one of the notches 54 registers with the control finger 92 at which time this finger then enters the notch thereby permitting full turning movement of the shaft 108 to permit the spring 44, plus the force of the liquid being pumped, to force the control valve 12 to completely closed position, thereby instantly stopping the dispensing flow.

Immediately that the pressure of the dispensing flow has been stopped by the closure of the control valve 32, the spring-actuated valve 142 in the nozzle likewise closes irrespective of any movement of the nozzle valve itself. The operator may then close the nozzle valve 138 if he so desires. It will thus be seen that purely by watching the gasoline in the tank, the operator is enabled to fill the tank full with the knowledge that he will have dispensed an exact and predetermined quantity of liquid corresponding to an exact and predetermined and precalculated price on the price chart which will now show through an appropriate window to indicate the price of the complete amount dispensed and likewise the fast and slow hands will by this time reach a corresponding indicating position to indicate the complete amount dispensed. As before stated, if the tank should become full by any miscalculation on the part of the operator, the operator may close the nozzle valve and thereby stop dispensing. It is further obvious that by selecting the proper graduation of the slotted disc as in pints or quarts, any probability of this occurring will be reduced to the minimum.

In the event that the nozzle valve is closed before the control finger registers with the slot in the slotted disc, it will be necessary before starting a subsequent operation to cause registration of the slotted disc with the control finger so that the correct operation of the device on a subsequent dispensing will take place. This resetting of the slotted disc is accomplished when the operator swings lever 195 to the dotted line position of Figure 8 in order to clear the hook 198 for reception of the nozzle. It is evident from Figure 8 that such movement of handle 195 rotates shaft 302 in a counterclockwise direction causing projection 355, to move with it to engage the righthand shoulder on gear sector 356. Due to the meshing of sectors 356 and 358, the latter receives a clockwise rotation and as a result, arm 360 follows and carries the lug or upturned portion 388 of pawl 362 out of engagement with stop 365 permitting spring 363 to force pawl 362 into engagement with the edge of the control disc 52. Further rotation carries the pawl along the periphery of the disc until it enters a notch in the disc and thereafter the disc and pawl move together until the latter abuts fixed stop 366 on the frame of the device. At this point the disc is so positioned that one of the notches 54 will be in alignment with pawl 92 which will accordingly drop into the notch and permit the shaft 108 to rotate to its home position to completely close valve 32 and to open the motor switch. Closing valve 32 enables it to act as a foot valve to keep the system full of liquid. Rotation of disc 52 relative to shaft 46 is permitted by the ball clutch device shown in Figure 11 and described above.

It will be also noted that the counterclockwise rotation of shaft 302 causes the arm 326 and pawl 328 to rotate in the same direction. During this rotation lug 352 on the pawl engages stop 348 and trips the pawl into engagement with ratchet 330. It is held in this position by the overcenter spring 340. The continued rotation of shaft 302 causes the pawl to ride idly over the ratchet teeth on ratchet 330 to a position such that when the lever 195 is again rotated to its full line position, Figure 8, the register resetting mechanism will be given sufficient motion to return the indicators to the zero indicating position.

It will be appreciated that with my improved type of device the operator, after the initiation of the dispensing operation may select the amount of liquid which he desires to dispense, and this selection may include any unit of measure he desires, or any multiple unit of measure, and it will also be apparent that this selection may take place at the remote control point, preferably at the nozzle end of the device, and is accomplished by pulling and maintaining tension upon the hose and then releasing the tension when the desired selection is made.

It is also apparent that after an operator has released the tension on the hose, thereby selecting the gallonage of liquid to be dispensed, and whereby the dispensing stops and an exact and predetermined amount of liquid is dispensed, say 5 gallons, the operator can subsequently start dispensing again and select an additional desired amount of liquid which will again be measured in a unit and exact amount. For example, with the control disc 52 rotating as during delivery, the operator may arrange to close the nozzle valve when any particular notch 54 comes into registration with the control finger 92, thereby stopping the dispensing, owing to the closure of the control valve 32. Subsequently, the resumption of dispensing from a remote point is accomplished by pulling upon the hose and maintaining a pull whereby the finger 92 is pulled out of its notch 54 and upon opening of the nozzle valve, the pump will then cause the liquid to flow and the control disc 52 will continue to rotate from the point or notch at which it stopped, and will continue to move until some subsequent notch comes into registration with the control finger, which has been released so as to drop in said subsequent notch. In other words, when an additional amount of liquid is desired, merely by pulling upon the hose again, not only may additional liquid be obtained, but any exact unit amount of liquid or any exact multiple unit amount of liquid may be obtained, and preferably from the remote control point. It will, of course, be obvious that this invention is not limited to the operation of the control finger from a remote control point, because this invention includes any desired operation or control of the control valve 32 or its equivalent either from a remote point or from a point at the pump pedestal 2.

It will also be apparent that my construction provides a meter which is adapted to control the rotation of a shaft preferably its own extension shaft, which shaft in effect, is divided into exact rotational increments, one-quarter in the present instance, the one-quarter rotational increments providing means for stopping the dispensing exactly at one of those increments. In other words, I provide a meter which actuates a clock mechanism to indicate the amount of liquid dispensed, but which, in addition, provides a control means for stopping the dispensing at an exact and predetermined point. In short, the meter carries a movable element adapted to operate indicating mechanism and also serving as a meter control for automatically stopping the dispensing at an exact and predetermined time corresponding to an exact and predetermined quantity and/or value of liquid to be dispensed, and these increments may be accumulated at the will of the operator until a desired and exact amount of liquid is dispensed. In other words, the meter mechanism not only measures and indicates the liquid, but constitutes its own automatic control for stopping the dispensing action at an exact self-measured amount of liquid.

With regard to the remote control, it must be obvious that by the arrangement of mechanism, particularly the arrangement of the control valve 32, and the pump and the interconnecting parts, I have provided means whereby the dispensing control can be started and stopped with the minimum exertion of energy from the pull hose nozle end of the device.

It will, of course, be appreciated that while the rotatable control device herein specifically illustrated as a slotted disc is driven by the meter, which meter in turn is actuated by the flow of liquid through the dispensing line, it is to be understood that insofar as the broad aspects of my invention are concerned, the device will be equally applicable to any mechanism which is operated as a result of the flow of liquid through the dispensing line when the dispensing operation has started.

What I claim as new and desire to secure by Letters Patent is:

1. In a liquid dispensing device, the combination of means forming a dispensing line through which liquid is adapted to be forced, said line comprising a movable portion, a meter in said line, a member rotatable in synchronized relation with the movement of said meter, a disc on said member, said disc having peripheral notches spaced apart in predetermined relation, a control valve in the dispensing line, a spring to maintain said valve in closed position, a control shaft, an arm on said shaft adapted on predetermined movement to open said valve, a second arm on said shaft, a stop member pivotally connected to said second arm and adapted by a predetermined movement to be moved into contact with said rotatable disc and upon rotation of said disc to engage a notch in said disc to stop rotation of said disc, and means actuated by movement of said movable portion of said dispensing line in one direction for actuating said control shaft to initiate closing of said valve and to move said stop member into contact with said disc.

2. In a liquid dispensing device, in combination with means forming a liquid dispensing line through which liquid is adapted to be forced, a portion of said line being movable, a volumetric displacement meter in said line including a drive shaft, an extension shaft adapted to be driven in controlled relation with said meter drive shaft, said extension shaft carrying a turnable stop member having a plurality of peripherally disposed spaced apart stops thereon, a control valve in said dispensing line, a shiftable stop member adapted to contact with any one of said stops on said turnable stop member, means connected for operation by the movable portion of said line and adapted to shift said stop member into contact with said turnable stop member when said line is moved to a predetermined position, and means operable upon contact of said shiftable stop member with on of said stops to cause the closure of said control valve, a nozzle control valve for stopping the flow in said liquid dispensing line at any time, and reset means for rotating said turnable stop member to cause one of said stops thereon to register with said cooperative stop member.

3. In a fluid dispensing device comprising a conduit, a meter, and means for supplying a flow of fluid through said conduit, the combination of control means adapted when in actuated position to cause a flow of fluid in said conduit and when in normal position to prevent a flow of fluid therein, means comprising a movable hose connected to said control means and adapted upon movement from a predetermined position to operate said control means to and maintain it in actuated position, a device controlled by said meter and hose and adapted to permit return of said control means to normal position when said hose is returned to said predetermined position, and when the final unit quantity of fluid is dispensed, and yieldable means for urging said control means toward normal position.

4. In a fluid dispensing apparatus having a fluid conduit, a meter in said conduit, means for supplying a flow of fluid in said conduit, the combination of means movable from a normal position to establish a flow of fluid in said conduit and returnable to normal position to interrupt said flow of fluid, remote control means comprising a flexible hose which is adapted to be moved to and from a neutral position, connected with said movable means and adapted, upon movement from neutral position, to operate said movable means from a normal position and adapted, upon movement to neutral position, to release said movable means for return to normal position, means adapted to return said movable means upon release thereof, and a meter controlled device arranged to prevent return of said movable means to normal position except when an exact unit quantity of fluid has been dispensed.

5. In a liquid dispensing device comprising a conduit terminating in a flexible portion, means for supplying a flow of fluid through said conduit, a meter in said conduit and a valve for controlling the flow of fluid therethrough, the combination of a member rotatable in timed relation with or independently of said meter and having control stations thereon which are spaced apart by distances representing the travel of said member during the dispensing of a unit quantity of fluid, connections between the flexible portion of said conduit and said control valve whereby the latter may be moved toward or from closing position by said hose, an element connected with said valve to be moved thereby toward or from said member as said valve is moved toward or from closing position, said member and element cooperating to permit closure of said valve when said element and one of said control stations are in alignment and means for orienting the control stations of said member with said element after a dispensing operation.

WILLIAM M. CARROLL.